(12) United States Patent
Netz et al.

(10) Patent No.: US 7,287,022 B2
(45) Date of Patent: Oct. 23, 2007

(54) SYSTEM AND METHOD FOR ANALYTICALLY MODELING DATA ORGANIZED ACCORDING TO RELATED ATTRIBUTES

(75) Inventors: Amir Netz, Bellevue, WA (US); Cristian Petculescu, Redmond, WA (US); Mosha Pasumansky, Redmond, WA (US); Richard R. Tkachuk, Sammamish, WA (US); Alexander Berger, Sammamish, WA (US); Paul J. Sanders, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 10/199,913

(22) Filed: Jul. 19, 2002

(65) Prior Publication Data
US 2004/0015507 A1    Jan. 22, 2004

(51) Int. Cl.
*G06F 17/30* (2006.01)
(52) U.S. Cl. ............................ 707/3; 707/10; 707/100; 707/103 Y
(58) Field of Classification Search .................... 707/3, 707/10, 1, 100, 103 Y
See application file for complete search history.

(56) References Cited

U.S. PATENT DOCUMENTS

| | | | |
|---|---|---|---|
| 5,978,788 A * | 11/1999 | Castelli et al. .................. 707/2 |
| 6,014,656 A * | 1/2000 | Hallmark et al. ............... 707/2 |
| 6,101,502 A * | 8/2000 | Heubner et al. ......... 707/103 R |
| 6,480,836 B1 * | 11/2002 | Colby et al. .................... 707/3 |
| 6,484,179 B1 * | 11/2002 | Roccaforte ................... 707/102 |
| 6,578,030 B1 * | 6/2003 | Wilmsen et al. ................ 707/3 |
| 7,171,427 B2 * | 1/2007 | Witkowski et al. ....... 707/104.1 |

OTHER PUBLICATIONS

Kotidis et al. An alternative storage organization of ROLAP aggregate views based on Cubetree, International Conference on Management of Data, 1998, pp. 249-258.*
Andreas Weininge. XPS a database server for data warehousing, Data Warehousing server for data warehousing, 2001, pp. 64-68.*
Dimitri Theodoratos. Heuristic Optimizaton of OLAP queries in multidimensionally hierarchically clustered databases, Data Warehouse and OLAP, 2001, pp. 48-55.*
Park et al. Rewriting OLAP queries using materialized views and dimension Hierarchies in Data Warehouse, Apr. 6, 2004, pp. 515-523.*
Horng et al. Materialized view selection using genetic algorithm in a Data Warehouse System, Evolutionary computation, 1999, Jul. 9, 1999, V. 3, lines 2221-2227.*
Espil, M.M. et al., "Efficient Intensional Redefinition of Aggregation Hierarchies in Multidimensional Dayabases", *DOLAP*, Nov. 9, 2001, 8 pages.

(Continued)

Primary Examiner—John Breene
Assistant Examiner—Baoquoc N. To
(74) Attorney, Agent, or Firm—Woodcock Washburn LLP

(57) ABSTRACT

A system and method for analytically modeling data with related attributes is disclosed. A single dimension is used to provide data according to each of the related attributes, and, thus, may be said to play the role of each related attribute depending on a received query. The measure of the analytical data model is tied to the dimension according to both data attributes to allow the measure to be analyzed by the dimension according to both attributes.

9 Claims, 6 Drawing Sheets

```
Sales 505
-Sale Quantity 214
```

```
Bill to / Ship to
Customer 510
-State 316
-City 314
-Name 312
-Customer ID 310
```

OTHER PUBLICATIONS

Harinarayan, V. et al., "Implementing Data Cubes Efficiently", *SIGMOD*, 1996, 205-216.

Hurtado, C.A. et al., "Updating OLAP Dimensions", *DOLAP*, 1999, 60-66.

Niemi, T. et al., "Constructing OLAP Cubes Based on Queries", *DOLAP*, Nov. 9, 2001, 9-15.

Pourabbas, E. et al., "Characterization of Hierarchies and Some Operators in OLAP Environment", *DOLAP*, 1999, 54-59.

* cited by examiner (Prior Art)

SYSTEM AND METHOD FOR ANALYTICALLY MODELING DATA ORGANIZED ACCORDING TO RELATED ATTRIBUTES

BACKGROUND OF THE INVENTION

1. Field of the Invention

The present invention relates to systems and methods for analytically modeling data organized and stored in a relational database, and, more particularly, to analytically modeling data organized according to related attributes.

2. Description of the Prior Art

Online analytical processing (OLAP) is a key part of many data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, an OLAP cube may be modeled according to a user's perception of the data. The cube may have multiple dimensions, each dimension modeled according to attributes of the data. Typically, there is a hierarchy associated with each dimension. For example, a time dimension can include years subdivided into months subdivided into weeks subdivided into days, while a geography dimension can include countries subdivided into states subdivided into cities. Dimension members act as indices for identifying a particular cell or range of cells within the cube.

OLAP services are often used to analytically model data that is stored in a relational database such as, for example, an Online Transactional Processing (OLTP) database. Data stored in a relational database may be organized according to multiple tables with each table having data corresponding to a particular data type. A table corresponding to a particular data type may be organized according to columns corresponding to data attributes. For example, data corresponding to the type "Sales" may be organized in a "Sales" table with columns "Ship-to Customer ID", "Bill-to Customer ID", and "Sale Quantity". Furthermore, data corresponding to the type "Customer" may be organized in a "Customer" table with columns "Customer ID", "Name", "City", and "State".

The "Ship-to Customer ID" and "Bill-to Customer ID" attributes of the "Sales" table are related attributes because they both cross-reference the "Customer ID" attribute of the "Customer" table. For each ship-to customer, data corresponding to the customer's "Name", "City", and "State" is stored in the "Customer" table on the row having the ship-to customer's "Customer ID". Likewise, for each bill-to customer, data corresponding to the customer's "Name", "City", and "State" is stored in the "Customer" table on the row having the bill-to customer's "Customer ID".

One issue that arises with regard to analytically modeling data from a relational database is how to best take into consideration data with such related attributes. In existing methods for analytically modeling data with related attributes, a plurality of dimensions each provides data to one of the related attributes. For example, an OLAP cube may be modeled according to data stored in the "Sales" and "Customer" tables of a relational database. The cube may have a first dimension modeled according to the "Customer" type and providing data according to the "Ship-to Customer" attribute and a second dimension modeled according to the "Customer" type and providing data "Bill-to Customer" attribute.

Modeling two dimensions that each provide data to one of the related attributes is a complex and time-consuming process because, for each dimension, data must be retrieved from multiple tables. The complexity and time required to model the cube would be greatly reduced if, rather than having two dimensions that each provide data to one of the related attributes, the cube has a single dimension that provides data to both related attributes. Thus, there is a need in the art for a system and method for analytically modeling data with related attributes, the system and method having a single dimension providing data to a plurality of related attributes.

SUMMARY OF THE INVENTION

Accordingly, in the present invention, a system and method for analytically modeling data with related attributes is disclosed. In a relational database, a first table organizes a first type according to a first attribute and a second attribute, and a second table organizes a second type according to a third attribute. The first attribute of the first table is related to the third attribute of the second table such that the first table may be cross-referenced to the second table thereby. The second attribute of the first table is related to the third attribute of the second table such that the first table may be cross-referenced to the second table thereby.

The data stored in the relational database is analytically modeled. A measure is modeled according to the first type of the first table. A dimension is modeled according to the second type of the second table. The measure is tied to the dimension according to the first attribute of the first table and the third attribute of the second table to allow the measure to be analyzed by the dimension according to the first attribute. The measure is also tied to the dimension according to the second attribute of the first table and the third attribute of the second table to allow the measure to be analyzed by the dimension according to the second attribute. Thus, the dimension provides data according to both the first attribute of the first table and the second attribute of the first table.

BRIEF DESCRIPTION OF THE DRAWINGS

The illustrative embodiments will be better understood after reading the following detailed description with reference to the appended drawings, in which.

DETAILED DESCRIPTION

Figure 1:
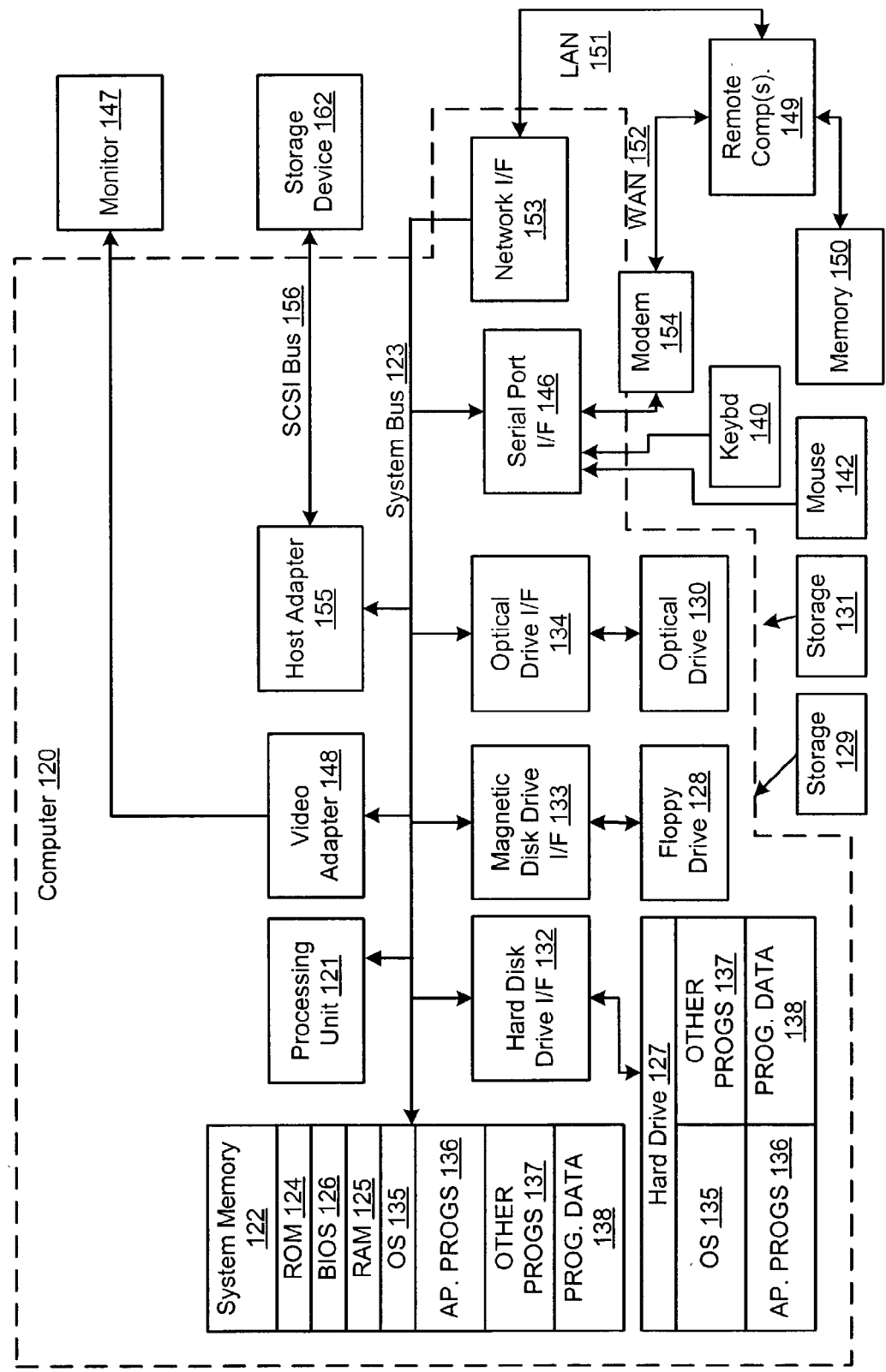
FIG. 1 is a block diagram representing a general purpose computer system in which aspects of the present invention and/or portions thereof may be incorporated.

A system and method for analytically modeling data with related attributes is disclosed below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Figure 2:
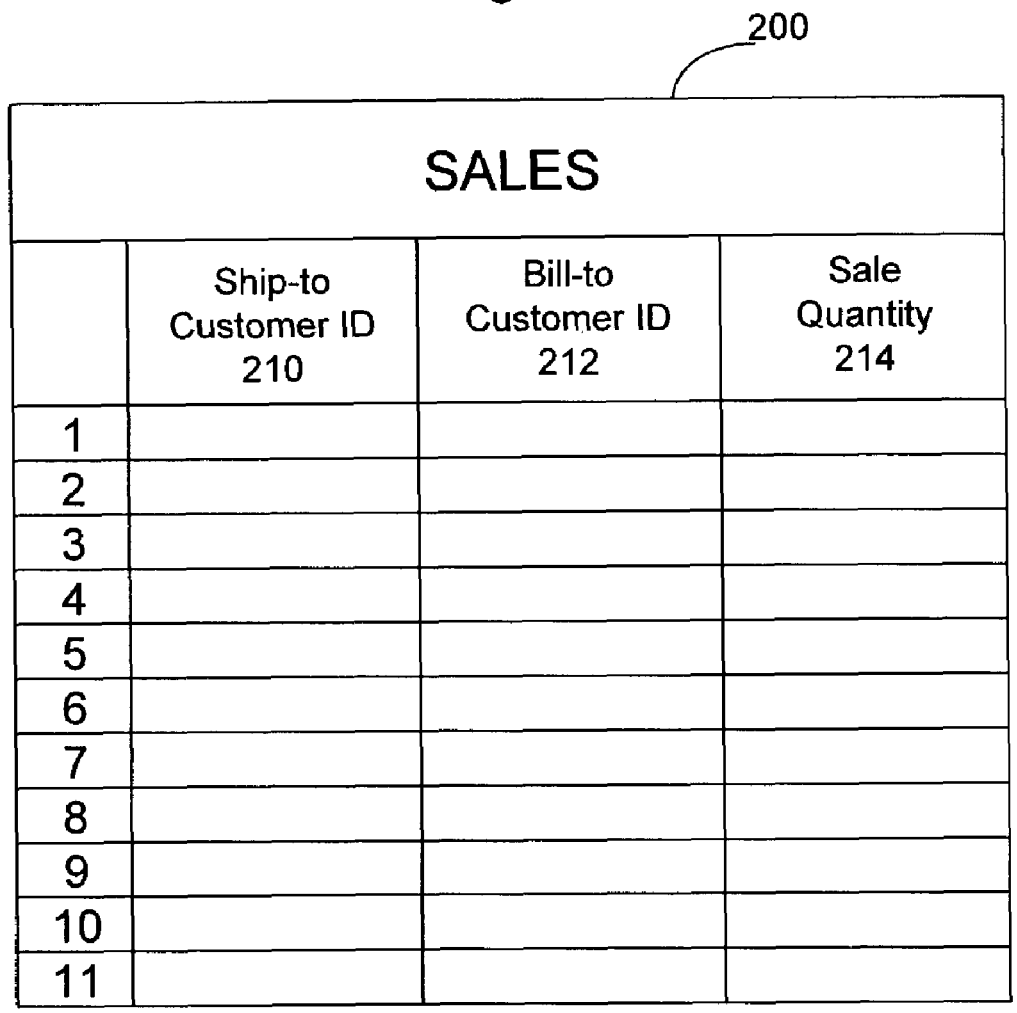
FIG. 2 is a sample relational database table corresponding to "Sales" data.
Figure 3:
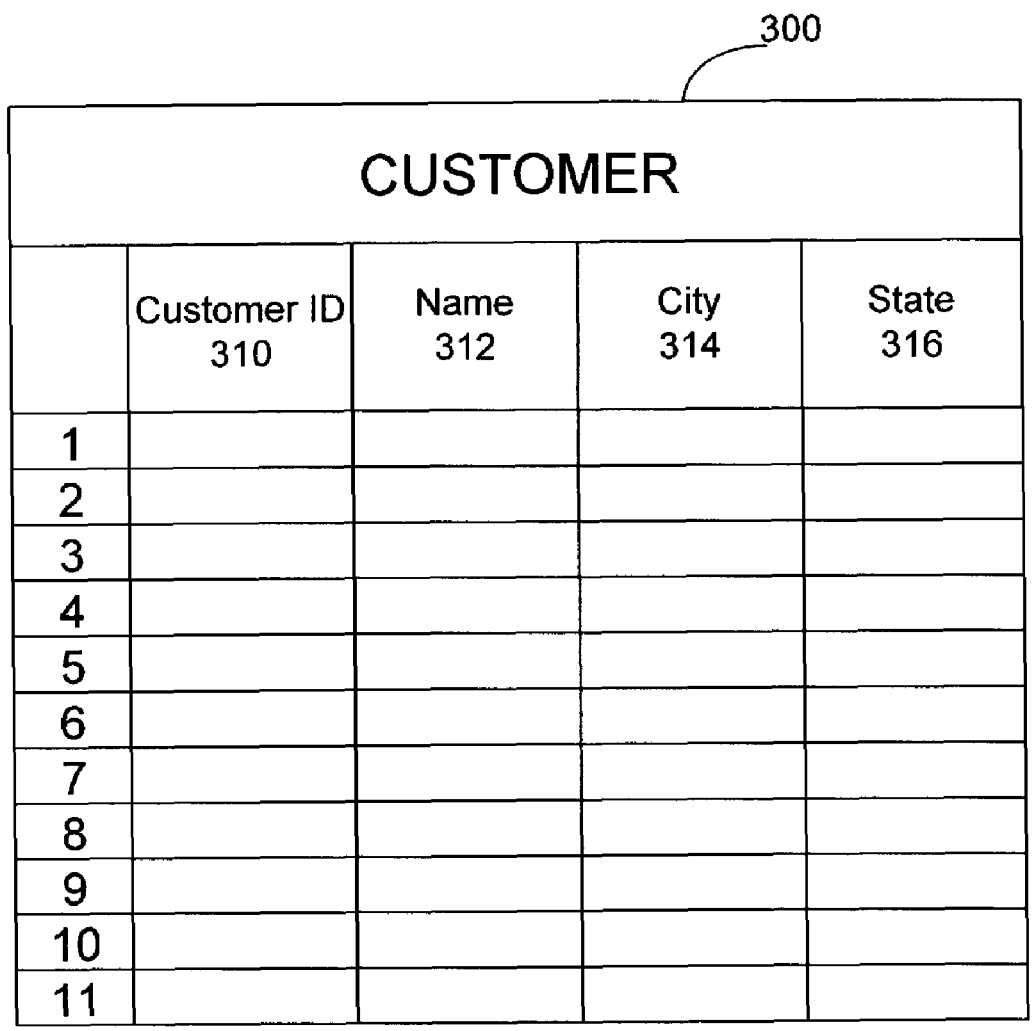
FIG. 3 is a sample relational database table corresponding to "Customer" data.

An analytical data service such as, for example, On-Line Analytical Processing (OLAP) may be employed to model data stored in a relational database such as, for example, an On-Line Transactional Processing (OLTP) database. As set forth previously, data stored in a relational database may be organized according to multiple tables, with each table having data corresponding to a particular data type. A table corresponding to a particular data type may be organized according to columns corresponding to data attributes. One such table is shown in FIG. 2, with data corresponding to the type "Sales" organized in a "Sales" table 200 with columns "Ship-to Customer ID" 210, "Bill-to Customer ID" 212, and "Sale Quantity" 214 and rows corresponding to individual sales entries. Another such table is shown in FIG. 3, with data corresponding to the type "Customer" organized in a "Customer" table 300 with columns "Customer ID" 310, "Name" 312, "City" 314, and "State" 316 and rows corresponding to individual customer entries.

The attributes "Ship-to Customer ID" 210 and "Bill-to Customer ID" 212 from "Sales" table 200 are related attributes because they both cross-reference the "Customer ID" attribute 310 from "Customer" table 300. That is, each ship-to customer in "Sales" table 200 is referenced according to a "Customer ID" 310 present in the "Customer" table 300 and data corresponding to a ship-to customer's name and city as stored in "Customer" table 300 on the row having the corresponding ship-to customer ID. Likewise, each bill-to customer in "Sales" table 200 is referenced according to a "Customer ID" 310 present in the "Customer" table 300 and data corresponding to a bill-to customer's name and city as stored in "Customer" table 300 on the row having the corresponding bill-to customer ID.

Figure 4:
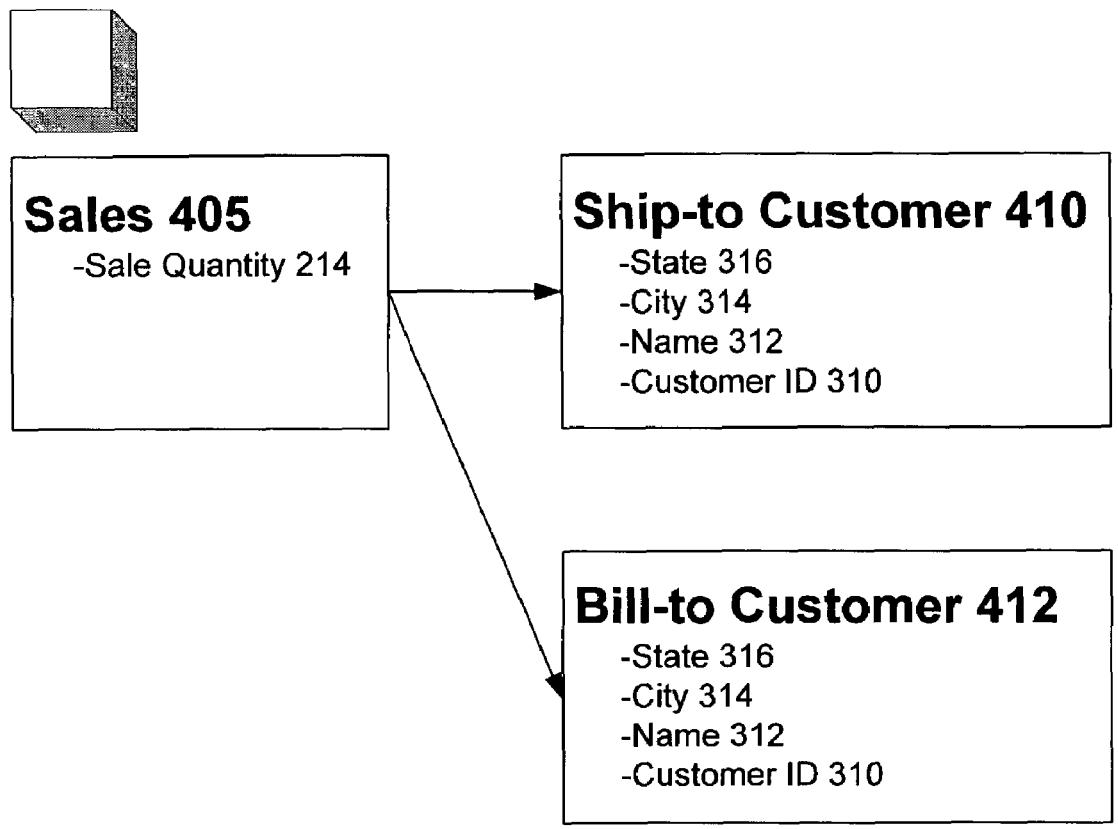
FIG. 4 is a prior art analytical data cube derived from the tables of FIGS. 2 and 3.

Referring now to FIG. 4, a prior art OLAP model of the data from "Sales" table 200 and "Customer" table 300 is shown as organized into a data cube 400. Cube 400 has a measure "Sales Quantity" 405 modeled according to the "Sales" type. Cube 400 has a first dimension 410 modeled according to the "Customer" type and providing data according to "Ship-to Customer" attribute 210. Cube 400 also has a second dimension 412 modeled according to the same "Customer" type and providing data according to "Bill-to Customer" attribute 212. As should be appreciated, other dimensions (not shown) may also be present based on other OLTP tables (not shown).

In cube 400, first dimension 410 and second dimension 412 each provide data to one of the related attributes "Ship-to Customer" 210 and "Bill-to Customer" 212, respectively. Again, modeling a cube 400 with two dimensions 410 and 412 that each provides data to one of two related attributes 210 and 212 is a complex and time-consuming process because, for each dimension, data must be retrieved from multiple tables 200 and 300. The complexity and time required to model the cube 400 would be greatly reduced if, rather than having two dimensions 410 and 412 that each provide data to one of the related attributes 210 and 212, the cube 400 had a single dimension that provided data to both related attributes 210 and 212. Thus, the system and method of the present invention models a cube with a single dimension providing data according to both related attributes 210 and 212.

Figure 5:
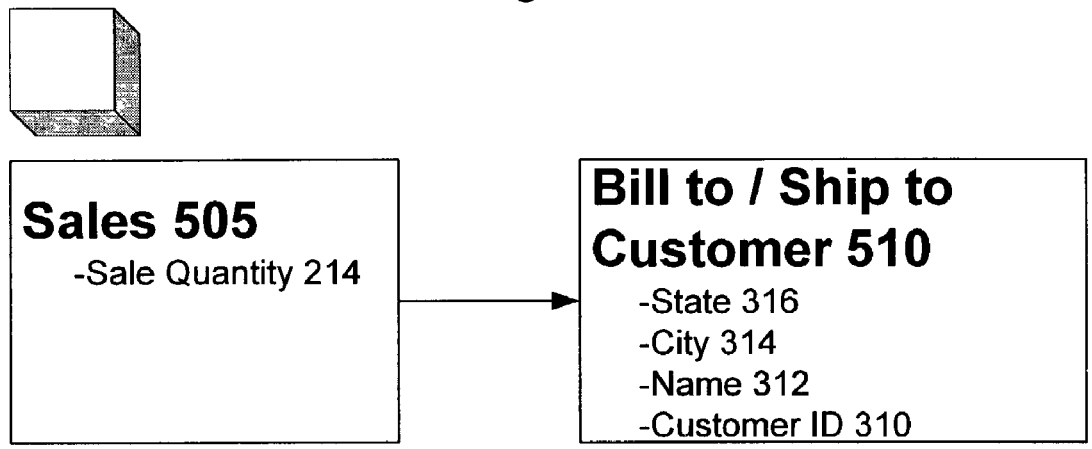
FIG. 5 is an analytical data cube derived from the tables of FIGS. 2 and 3 in accordance with one embodiment of the present invention.

In particular and referring now to FIG. 5, in one embodiment of the present invention, analytical data cube 500 is an OLAP model of the data from "Sales" table 200 and "Customer" table 300. As seen, cube 500 has a measure "Sales Quantity" 505 modeled according to the "Sales" type. Cube 500 also has a single dimension 510 modeled according to the "Customer" type of the "customer" table 300 of FIG. 3, where such dimension 510 provides data according to both "Ship-to Customer" attribute 210 and "Bill-to Customer" attribute 212 of "Sales" table 200. Unlike prior art data cube 400 of FIG. 4 that has two dimensions 410-412, each modeled according to the "Customer" type, data cube 500 of FIG. 5 has only the single dimension 510 modeled according to the "Customer" type and providing data for both the "Ship-to Customer" attribute 210 and the "Bill-to Customer" attribute 212, in effect playing the role of each attribute 210 and 212 according to a particular query. By eliminating the duplication of the second dimension, the single "role playing" dimension makes the cube easier to define and reduces both the time required to build the cube and the storage size required for the data in the cube.

Figure 6:
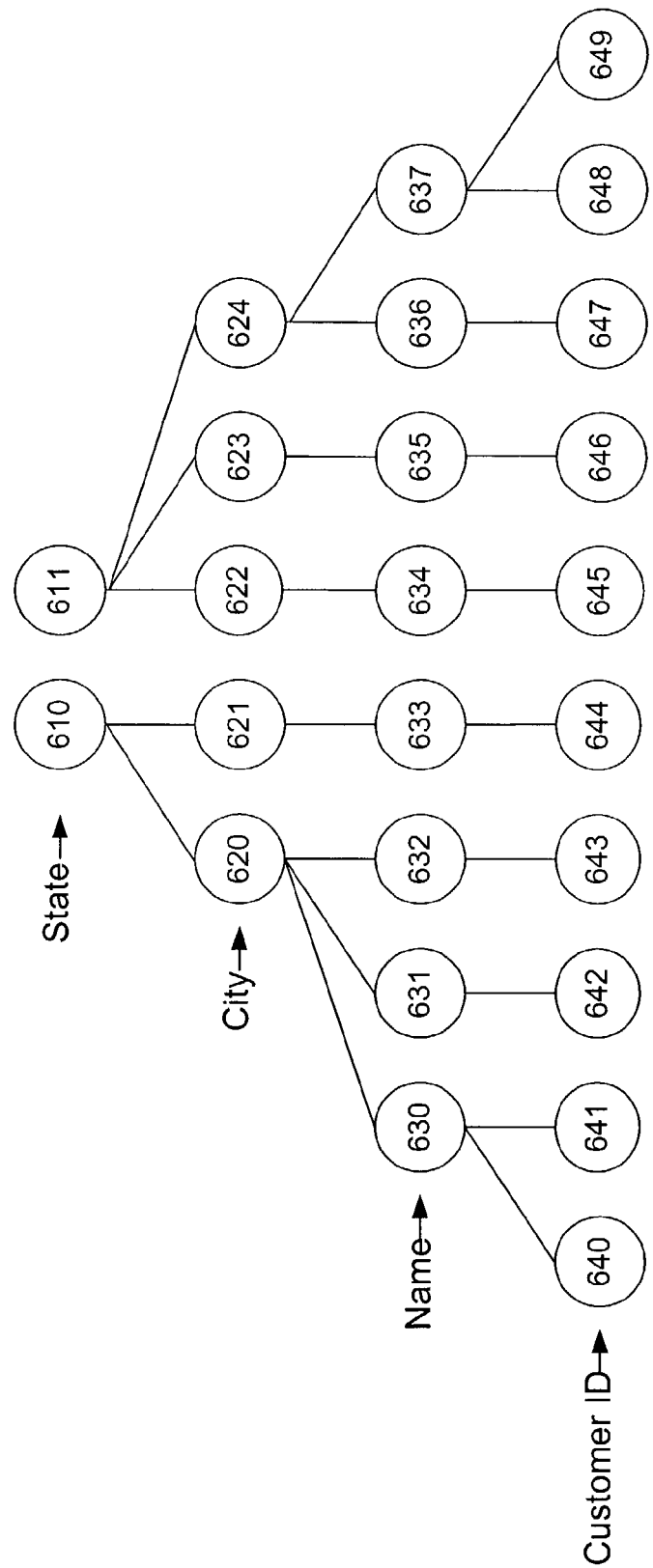
FIG. 6 is a hierarchical data tree showing data organized in a dimension according to a plurality of gradations.

Dimension 510 may have a dimension hierarchy represented in a grossly simplified fashion by data tree 600 as shown in FIG. 6. Nodes 610 and 611 in the top row are "State" nodes corresponding to "State" attribute 316 in FIG. 3. Nodes 620-624 in the second row are "City" nodes corresponding to "City" attribute 314 in FIG. 3. Nodes 630-637 in the third row are "Name" nodes corresponding to "Name" attribute 312 in FIG. 3. Nodes 640-649 in the fourth row are "Customer ID" nodes corresponding to "Customer ID" attribute 310 in FIG. 3. As should be appreciated, one advantage of a hierarchically organized analytical data model is that such a model allows data to be aggregated in response to a query. In particular, data aggregated according to the dimension hierarchy of FIG. 6 may be aggregated based on any of the levels in the hierarchy. For example, if a query requires a sales quantity for a specific city, then data may be aggregated by "City" attribute 314 and the second row of data tree 600.

Using cube 500 in response to a query should be apparent to the relevant public. Accordingly, no particular example is provided. Generally, based on whether a particular query requests data according to a bill-to customer or a ship-to customer, the dimension acts to play the role of each bill-to customer or each ship-to customer, respectively.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

While the invention has been described and illustrated with reference to specific embodiments, those skilled in the art will recognize that modifications and variations may be made without departing from the principles of the invention as described above and set forth in the following claims. For example, while the invention has been described with reference to a "Sales" table and a "Customer" tables the invention may be used in conjunction with any table from a relational database. Furthermore, the analytical data models of the present invention may comprise any number of dimensions corresponding to any number of data attributes. Accordingly, reference should be made to the appended claims as indicating the scope of the invention.

We claim:

1. A computer readable medium having stored thereon computer-executable instructions for performing steps comprising:

generating a data cube that comprises at least three dimensions, one of the three dimensions being a first dimension that represents both a first data attribute and a second data attribute, the first data attribute not being a sub-set of the second data attribute;

receiving a first query that requests a first portion of data within the data cube, the first query requesting data according to the first attribute, the first query not requesting data according to the second attribute;

responsive to receiving the first query:
configuring the data inside the data cube to adapt to the first query such that the first dimension provides data according to the first attribute and not the second attribute;

processing the first query by retrieving data from the data cube; and displaying results of the first query to a user;

receiving a second query that requests a second portion of data within the data cube, the second query requesting data according to the second attribute, the second query not requesting data according to the first attribute;

responsive to receiving the second query:
- reconfiguring the data inside the data cube to adapt to the second query such that the first dimension provides data according to the second attribute and not the first attribute;
- processing the second query using the data cube; and
- displaying results of the second query to a user.

2. The computer readable medium of claim 1 having further computer-executable instructions for performing the step of: retrieving data from a relational database with which to generate the data cube.

3. The computer readable medium of claim 1, wherein the data cube is formatted for online analytical processing.

4. A method for query processing using a data cube with a first dimension that represents multiple attributes, the method comprising:
- generating the data cube that comprises at least three dimensions, one of the three dimensions being the first dimension that represents both a first data attribute and a second data attribute, the first data attribute not being a sub-set of the second data attribute;
- receiving a first query that requests a first portion of data within the data cube, the first query requesting data according to the first attribute, the first query not requesting data according to the second attribute;
- responsive to receiving the first query:
  - configuring the data inside the data cube to adapt to the first query such that the first dimension provides data according to the first attribute and not the second attribute;
  - processing the first query by retrieving data from the data cube and
  - displaying results of the first query to a user;
- receiving a second query that requests a second portion of data within the data cube, the second query requesting data according to the second attribute, the second query not requesting data according to the first attribute;
- responsive to receiving the second query:
  - reconfiguring the data inside the data cube to adapt to the second query such that the first dimension provides data according to the second attribute and not the first attribute;
  - processing the second query using the data cube; and
  - displaying results of the second query to a user.

5. The method of claim 4, further comprising:
retrieving data from a relational database with which to generate the data cube.

6. The method of claim 4, comprising generating the data cube formatted for online analytical processing.

7. A system for query processing using a data cube with a first dimension that represents multiple attributes, the system comprising:
- a processor operative to execute computer-executable instructions; and
- memory having stored therein computer-executable instructions for performing steps comprising:
  - generating the data cube that comprises at least three dimensions, one of the three dimensions being the first dimension that represents both a first data attribute and a second data attribute, the first data attribute not being a sub-set of the second data attribute;
  - receiving a first query that requests a first portion of data within the data cube, the first query requesting data according to the first attribute, the first query not requesting data according to the second attribute;
  - responsive to receiving the first query:
    - configuring the data inside the data cube to adapt to the first query such that the first dimension provides data according to the first attribute and not the second attribute;
    - processing the first query by retrieving data from the data cube; and
    - displaying results of the first query to a user;
  - receiving a second query that requests a second portion of data within the data cube, the second query requesting data according to the second attribute, the second query not requesting data according to the first attribute;
  - responsive to receiving the second query:
    - reconfiguring the data inside the data cube to adapt to the second query such that the first dimension provides data according to the second attribute and not the first attribute;
    - processing the second query using the data cube; and
    - displaying results of the second query to a user.

8. The system of claim 7, wherein the data cube is generated by retrieving data from a relational database.

9. The system of claim 7, wherein the data cube is formatted for online analytical processing.

* * * * *